June 10, 1924.
E. E. ROUSH
1,496,830
LAWN MOWER SHARPENER
Filed Dec. 13, 1922
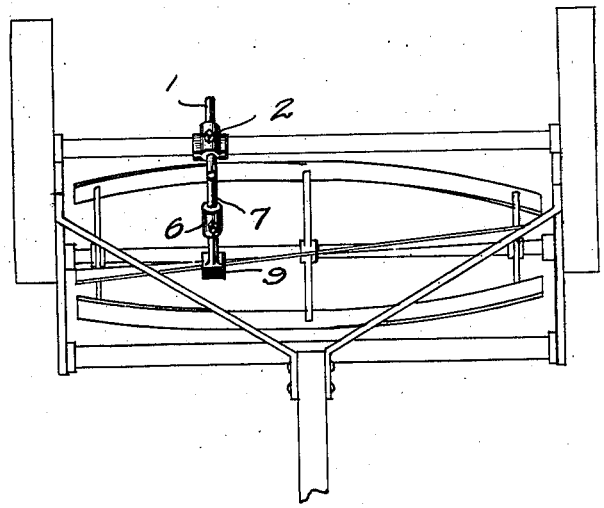
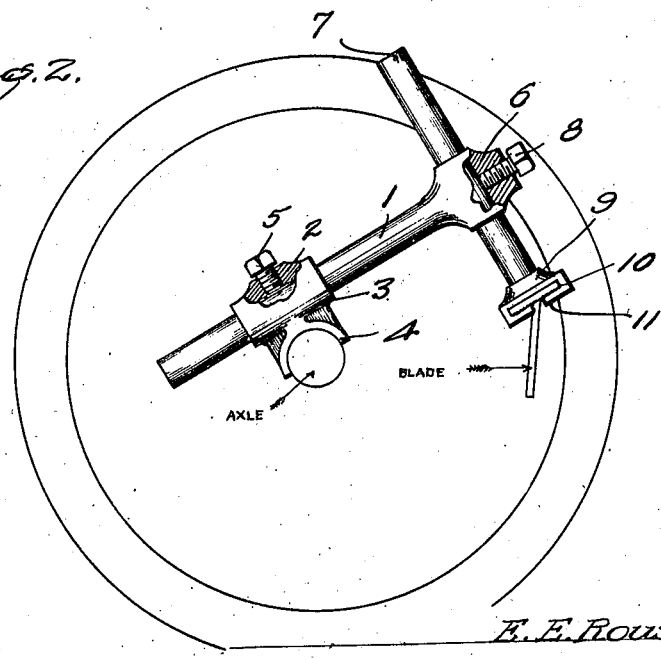
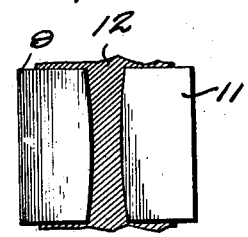
E. E. Roush INVENTOR.
Witness
BY
ATTORNEY.

Patented June 10, 1924.

1,496,830

UNITED STATES PATENT OFFICE.

EMERSON E. ROUSH, OF GOODLAND, KANSAS.

LAWN-MOWER SHARPENER.

Application filed December 13, 1922. Serial No. 606,674.

*To all whom it may concern:*

Be it known that I, EMERSON E. ROUSH, a citizen of the United States, residing at Goodland, in the county of Sherman and State of Kansas, have invented certain new and useful Improvements in a Lawn-Mower Sharpener, of which the following is a specification.

The present invention relates to a lawn mower sharpener and has for its principal object to provide a device of this nature which is readily adjustable so as to be operated efficiently upon lawn mowers of various sizes and which may also be adjusted so as to file the blade with any desired beveled edge.

Another important object of the invention is to provide a device of this nature which will be simple and efficient in construction, reliable in operation, easily manipulated, inexpensive to manufacture, durable, and well adapted to the purpose for which it is designed.

With the above and numerous other objects in view as will appear as the description progresses, the invention resides in certain novel features of construction and in the combination and arrangement of parts as will be hereinafter more fully described and claimed.

For the purpose of illustrating my invention, I have shown in the accompanying drawing that form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

In the drawing—

Figure 1 is a top plan of a lawn mower showing my sharpener in position for operation thereon, Figure 2 is an elevation of the sharpener showing diagrammatically certain portions of a lawn mower associated therewith, and Figure 3 is a detail plan view of the file receiving member.

Referring to the drawing in detail it will be seen that the sharpener consists of a bar 1 mounted in a guide block 2 which consists of the cylindrical portion 3 having mounted thereon a semicylindrical portion 4 disposed at right angles thereto. The bar 1 is received in the cylindrical portion 3 and is held in adjusted position by a set screw 5. The bar 1 terminates at one end in a head 6 having a bore extending therethrough at right angles to the bore of the guide block 2 that is of the cylindrical portion 3 thereof and a rod 7 is slidably mounted in the bore of the head 6 and is held in adjusted position by the set screw 8. One end of this rod 7 terminates in a file receiving member 9 constructed with a seat 10 having the overhanging lips 11 which terminate in spaced relation to each other and in curved edges as is seen to advantage in Figure 3. A piece of a file 12 is disposed in the seat 10.

In using this device a consideration of Figures 1 and 2 will show that the semicylindrical portion of the guide block 2 is disposed on the axle of the lawn mower or some other suitable portion thereof and the piece of file 12 is engaged with the blade. The lawn mower is preferably positioned with one wheel off the ground so that the blades may turn readily. The device is then moved with a reciprocatory motion transversely of the lawn mower that is longitudinally of the blade with which the file is engaged and the proper bevel will be placed upon the blade. When the device is set as desired the set screws 5 and 8 are of course tightened and the other blades will be filed in the exact same manner as was the first blade and thus the lawn mower will be uniformly sharpened. The desired bevel on the blade may be changed by an adjustment of the rod 7 in relation to the bar 1 and also by an adjustment of the bar 1 in relation to the guide block 2. In like manner various sizes of lawn mowers may be accommodated.

Having thus described my invention what I claim as new is:—

1. In a device of the class described, a guide block including a cylindrical portion and a semicylindrical portion disposed at right angles to the cylindrical portion, a bar slidably mounted in the cylindrical portion, a set screw in the cylindrical portion for holding the bar in adjusted position, said bar terminating in a head having a bore extending therethrough at right angles to the bore of the cylindrical portion of the guide block, a rod slidably mounted in the bore, a set screw in the head for holding the rod in adjusted position, and a file receiving member on the end of the rod.

2. In a device of the class described, a guide block including a cylindrical portion and a semi-cylindrical portion disposed at an angle to the cylindrical portion, a bar slidably mounted in the cylindrical portion, means in the cylindrical portion for holding the bar in adjusted position, a rod slidably mounted through the bar so as to be disposed at an angle to the bore of the cylindrical portion of the guide block, means on the bar for holding the rod in adjusted position, and a file-receiving member on the end of the rod.

In testimony whereof I affix my signature in presence of two witnesses.

EMERSON E. ROUSH.

Witnesses:
C. W. GREGORY,
H. R. HILLMAN.